United States Patent
Akins et al.

[19]

[11] Patent Number: 5,964,548
[45] Date of Patent: Oct. 12, 1999

[54] PANEL CONNECTOR

[75] Inventors: Allan Akins; Joe Kuffner; Len Peters, all of Winnipeg, Canada

[73] Assignee: Hi-Qual Manufacturing Ltd., Monitoba, Canada

[21] Appl. No.: 08/827,197

[22] Filed: Mar. 27, 1997

[51] Int. Cl.[6] ............................... F16B 7/00; E04H 17/18
[52] U.S. Cl. ..................... 403/398; 403/399; 256/24; 256/26; 292/106; 292/DIG. 13
[58] Field of Search ................... 256/24, 25, 26, 256/59, 65, 31, 73; 160/351, 135; 403/398, 399, 321, 353, 384; 292/101, 106, 102, DIG. 13

[56] References Cited

U.S. PATENT DOCUMENTS

| | | | |
|---|---|---|---|
| 1,688,543 | 10/1928 | Highers | 292/106 |
| 2,074,759 | 3/1937 | Richarda | 292/DIG. 13 X |
| 2,577,930 | 12/1951 | Thomas | 292/68 |
| 3,204,606 | 9/1965 | Parr et al. | 256/26 X |
| 3,770,246 | 11/1973 | Key | 256/26 X |
| 3,815,877 | 6/1974 | Turner | 256/24 |
| 3,918,753 | 11/1975 | McCormack et al. | 292/216 |
| 3,993,289 | 11/1976 | Lewis et al. | 256/65 X |
| 4,355,829 | 10/1982 | Gregory | 292/68 |
| 4,356,999 | 11/1982 | McShane | 256/26 |
| 4,371,148 | 2/1983 | Harden | 256/26 |
| 4,844,424 | 7/1989 | Knudslien | 256/24 X |
| 4,919,463 | 4/1990 | McQuade | 292/106 X |
| 5,375,815 | 12/1994 | Akins | 256/24 X |

FOREIGN PATENT DOCUMENTS

| | | | |
|---|---|---|---|
| 85197 | 2/1964 | France | 256/24 |

OTHER PUBLICATIONS

HW Brand Brochure/Catalog, Hutchison Incorporated.(No Date).
HiQual News "Cattleman Approved Livestock Handling Equipment" Newspaper, Summer 1996.

*Primary Examiner*—Harry C. Kim
*Attorney, Agent, or Firm*—Trexler, Bushnell, Giangiorgi & Blackstone, Ltd.

[57] ABSTRACT

A connector for connecting panels surrounding an enclosure for cattle or horses allows one person working alone to connect adjacent panels. The connector comprises a U-shaped portion having a down-turned leg on one end and an up-turned leg on another end. The down-turned leg is pivotally connected to a post of a first panel. A post of a second panel is moved adjacent the post of the first panel. The U-shaped portion is then pivoted around the post of the second panel. A slidable sleeve, which is slidably engaged to the first post, is lowered to slidably engage the up-turned leg of the U-shaped portion, thereby connecting the adjacent panels.

14 Claims, 9 Drawing Sheets

PANEL CONNECTOR

FIELD OF THE INVENTION

The invention relates to connectors and is particularly concerned with connectors for connecting panels enclosing horses or cattle.

BACKGROUND OF THE INVENTION

In the ranching of horses and cattle, portable panels are often erected and connected to each other to form temporary or semi-permanent enclosures or pens. Each panel typically comprises a pair of spaced vertical end posts and a plurality of horizontal cross rails. The panels are usually supported by the cooperation of one or more adjacent panels. Often such pens are erected on uneven ground by one person working alone. Accordingly, it is desirable that such panels be readily connected to each other by one person working alone on uneven ground. It is also desirable that connectors used to connect such panels be strong enough to withstand forces exerted on the panels by the enclosed animals.

Several different types of connectors for connecting panels enclosing horses or cattle or to connect fencing posts are well-known. For example, non-rigid, chain connectors have frequently been used for this purpose. One technique for using non-rigid chain connectors is to weld one end of the chain to one post of a panel. The chain then wraps around a post of an adjacent next panel (or fence post) and locks by one of various means. Such chain connectors tend to be difficult to use by one person on uneven ground since they typically require one person to hold the panels or fence posts steady, while another person, using two hands, wraps the chain around the panels or posts being connected. Further, when the panels or posts are transported, the chains tend to dangle and therefore they can easily become tangled with each other. Further, chains are less aesthetically pleasing than many rigid connectors, which is an important consideration to many horse owners as well as organizers and participants of horse events.

Another common type of connector used to connect panels or posts are male to female connectors, such as that illustrated in FIGS. 5 and 6 of U.S. Pat. No. 4,371,148 issued to Harden in 1983. With male to female connectors, one member (ie: one of the male and female member) is typically attached to one post of one panel and the other member is attached a post of another panel. In order to effect rigid connection of adjacent posts, it is typically necessary to use at least two sets of male to female connectors, one set above the other. To connect adjacent panels or posts, the panel with the male member is typically lifted to fit the male member into the female member of the adjacent panel, as shown in FIGS. 5 and 6 of the Harden patent. Accordingly, it is very difficult for one person working alone to tear down and/or reconnect panels using such male to female connectors, especially on uneven ground.

Other constructions of male to female connectors may incorporate a pin as the male member which can be lifted up and dropped down into the female member without lifting the entire panel. With either type of male to female connector, it is difficult to connect panels on uneven ground, since the male and female members are typically attached to their respective posts at a pre-determined height, necessitating their being connected at the pre-determined height. Further, male to female connectors, in use, create a gap between adjacent connected panels. Such gaps are dangerous to cattle and horses which may catch a leg in the gap and suffer injuries, requiring, in some case, the animal having to be put down.

The prior art also reveals other devices which could be used to connect panels or posts, but which also suffer from the drawbacks noted above. For example, U.S. Pat. Nos. 4,355,829 and 3,918,753 issued to Gregory in 1982 and McCormack in 1975, respectively, each describe connectors which appear to be specifically intended for connecting a hinged gate to a stationery gate, and would be of only marginal use to connect non-hinged gates (or panels or posts). Both of these patents describe devices considerably more complicated than the male to female connectors described above. Further, each of the devices described in these patents, when in use, creates a gap between adjacent panels or posts, thereby acting as a hazard to cattle or horses, for the reason noted above. As well, each of the devices described in these patents, similar to the male to female connectors, requires a portion of the device to be affixed to both of the adjacent panels or posts before the panels or posts can be connected. Accordingly, these devices would likely be difficult to install, especially for one person working alone on uneven ground, due to the need to adjust the height of the corresponding portions of the devices on the adjacent panels or posts.

U.S. Pat. No. 2,577,930 issued to Thomas in 1949 also describes a means to connect a hinged gate to a stationery gate. This device would be of marginal value to connect unhinged gates (or panels or posts) and also creates a gap between adjacent gates which could be hazardous to cattle or horses, for the reasons noted above.

SUMMARY OF THE INVENTION

It is an object of the invention is to obviate or mitigate one or more of the above identified disadvantages.

According to a first broad aspect, the invention provides a connector for detachably connecting adjacent fencing panels, said fencing panels including a plurality of horizontal frame members and two vertically disposed end posts, said connector being rigid and secured into mountings on an end post of a first panel and adapted to encompass an end post of a second panel when the connector is in a connected position.

According to another broad aspect, the invention provides in a panel system for confining an animal comprising a plurality of panels, each panel comprising an integral, substantially rectangular rigid structure including a bottom, a top, a first end and a second end, a connector having an open position and a closed position for connecting a first end of a first panel to a second end of an adjacent panel, the connector comprising a rigid, U-shaped portion; a pivotal connection means for pivotally connecting the U-shaped portion to the first end of the first panel; and a sliding sleeve, slidably connected to the first end of the first panel and adapted to secure the U-shaped portion in the closed position wherein, from the open position, the U-shaped portion is rotatable about the second end of the adjacent panel and the sliding sleeve is slidable to secure the U-shaped portion in the closed position.

According to another broad aspect, the invention provides a connector for fence panels comprising a slidable, vertically oriented female bracket; said bracket being adapted to secure a first vertically oriented portion of a male connector; said bracket being adapted to move vertically on a first fence panel post of a first fence panel from a connected position to an unconnected position; said connector having a second rigid curvilinear portion being substantially in a horizontal plane; said curvilinear portion being adapted to encompass a second fence panel post of a second fence panel; and said connector having a third vertically oriented portion adapted to hinged engage a female fitting fixedly attached to said first panel post.

According to yet another broad aspect, tie invention provides a connector for fence posts including a female and male connecting portion being both vertically disposed on a fence panel post of a first fence panel and a horizontally disposed rigid curvilinear portion is adapted to encompass an adjacent fence post of a second adjacent fence panel; said connector being hinged connected at one end to said post of said first fence panel and having an opposite end adapted to be secured within a vertically slidable sleeve mounted on said post of said first fence panel According to yet another broad aspect, the invention provides a panel in a panel system for confining an animal, the panel system comprising a plurality of panels, each panel comprising an integral, substantially rectangular rigid structure including a bottom, a top, a first end and a second end wherein the panel comprises a connector having an open position and a closed position for connecting a first and of the panel to a second end of an adjacent panel, the connector comprising a rigid, U-shaped portion; a pivotal connection means for pivotally connecting the U-shaped portion to the first end of the panel; and a sliding sleeve, slidably connected to the first end of the panel and adapted to secure the U-shaped portion in the closed position wherein, from the open position, the U-shaped portion is rotatable about the second end of the adjacent panel and the sliding sleeve is slidable to secure the U-shaped portion in the closed position.

According to yet another broad aspect, the invention provides a connector for detachably connecting adjacent fencing panels said panels including a plurality of horizontal frame members and two vertically disposed end posts, said connector being rigid and adapted to encompass an end post of a first panel and to be slidably secured into mountings on an adjacent end post of a second panel in a first connected position, and said connector being adapted to be moved vertically about said adjacent end posts out of said mountings into a second disconnected position.

According to yet another broad aspect, the invention provides in a panel system for confining an animal comprising a plurality of fencing panels, each panel comprising an integral, substantially rectangular rigid structure including a bottom, a top, a first end and a second end, a connector for connecting a first end of a first panel to a second end of an adjacent panel, the connector comprising a rigid, U-shaped portion slidably connected to the first end of the first panel; a fixed sleeve projecting from the second end of the adjacent panel and adapted to receive a first end of the U-shaped portion; and a sliding sleeve, slidably connected to the second end of the adjacent panel and adapted to receive a second end of the U-shaped portion wherein, to connect the first end of the first panel to the second end of the adjacent panel, the first end of the U-shaped portion is slid into the fixed sleeve and then the sliding sleeve is slid onto another end of the U-shaped portion.

The connector of the present invention provides certain advantages which allow adjacent panels to be connected without creating a gap between the connected panels through which cattle or horses could catch a leg. The invention also allows one person working alone to connect panels or tear down connected panels an uneven ground.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
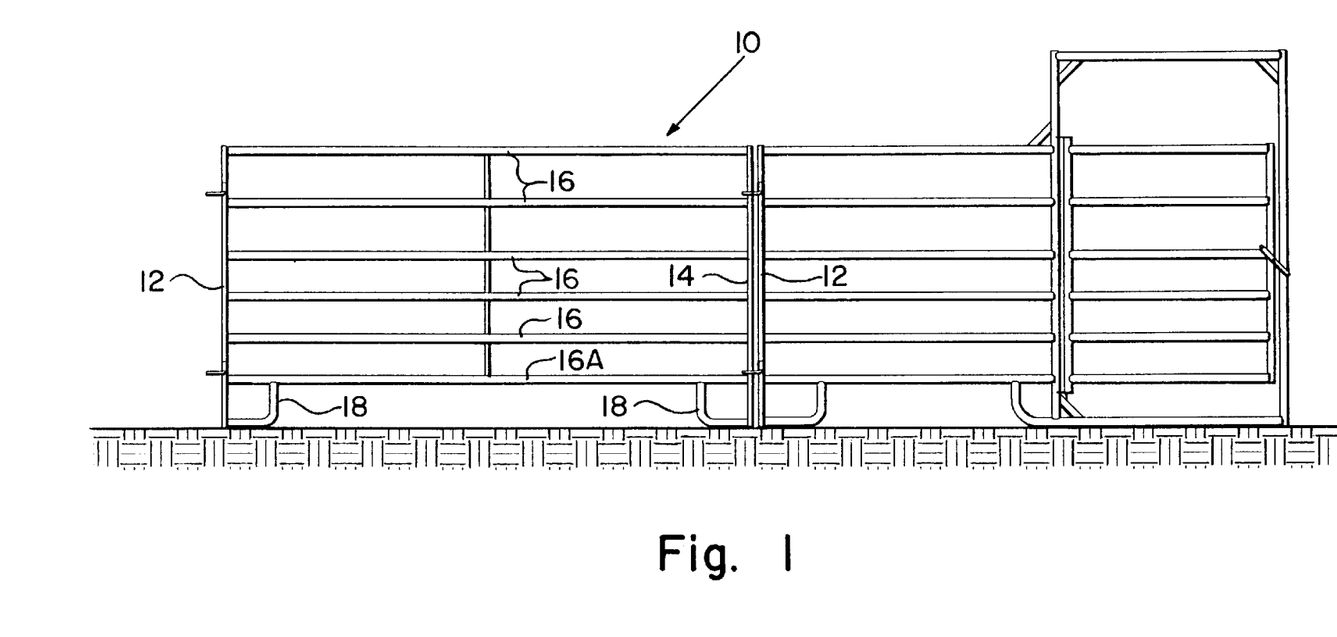
FIG. 1 is a side view of several panels connected using the panel connectors in accordance with an embodiment of the present invention.

Portable paneled are often used to create temporary or semi-permanent pens surrounding cattle or horses. The panels are connected to each other by means of connectors. As shown in FIG. 1, each panel, generally designated as 10, typically comprises a first vertical post 12 at one end and a second vertical post 14 at a second end. The first post 12 and second post 14 of a single panel 10 are connected by a plurality of horizontal parallel rails 16. A lowermost one of the horizontal rails 16A is spaced from the ground so that the base of the posts 12 and 14 projects beyond the lowermost rail 16A into contact with the ground to support the panel standing upwardly from the ground.

At the bottom of the posts 12 and 14 is provided a pair of bumpers 18 formed by a metal leg welded onto the base of the posts 12, 14 and extending therefrom parallel to the bottom rail and then turned upwardly to engage the bottom rail and positioned part way along. This construction resists the tendency of a simple post to sink into soft ground. With the bumpers 18 of the panel resting on the ground, the top rail is at a sufficient height to confine the enclosed animal(s).

Figures 2A, 2B:
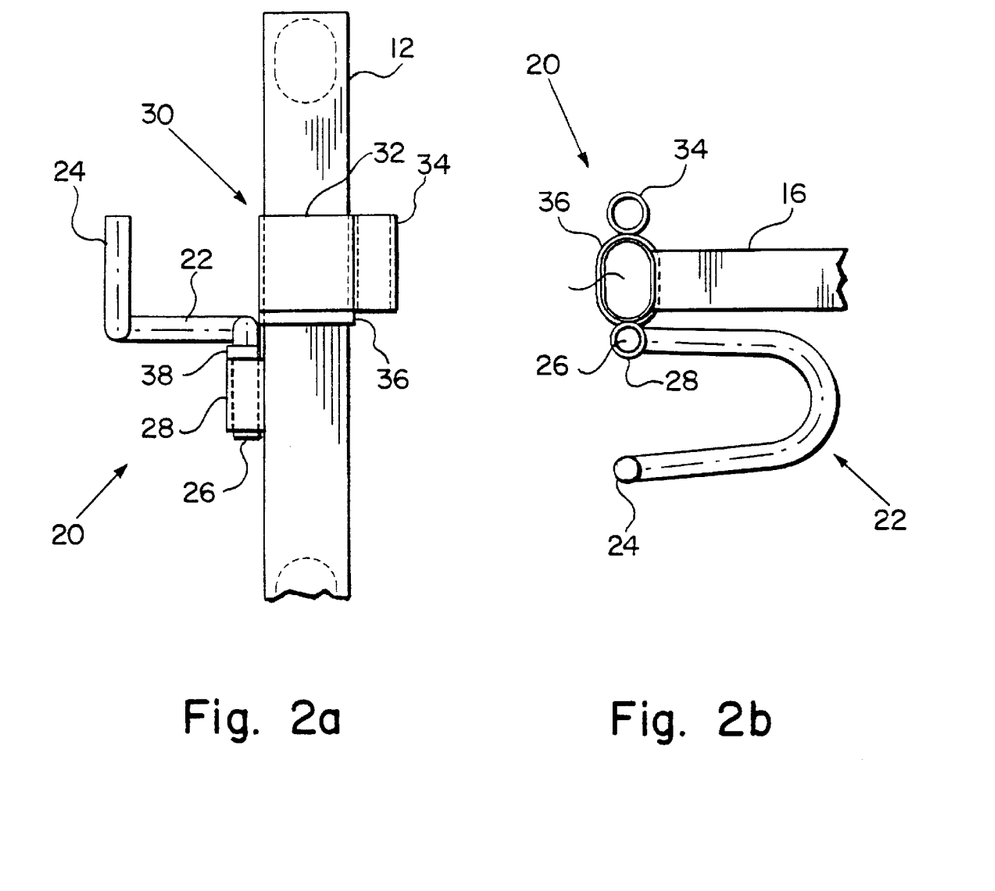
FIGS. 2a and 2b arc side and top views, respectively, of the panel connector in accordance with an embodiment of the present invention.
Figure 3A:
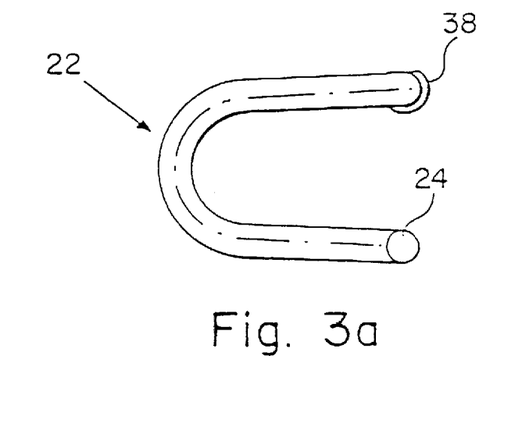
FIGS. 3a and 3b are top and side views, respectively, of the U-shaped portion of the panel connector of FIGS. 2a and 2b.
Figure 3B:
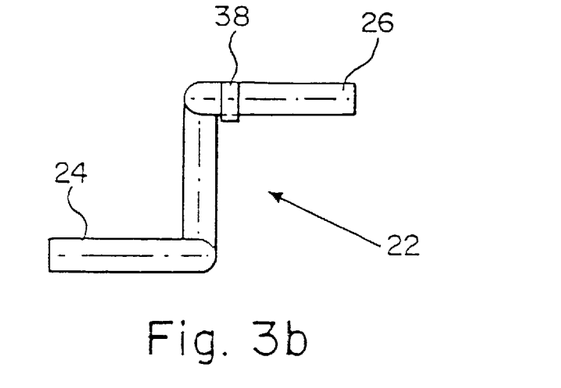
Figure 4A:
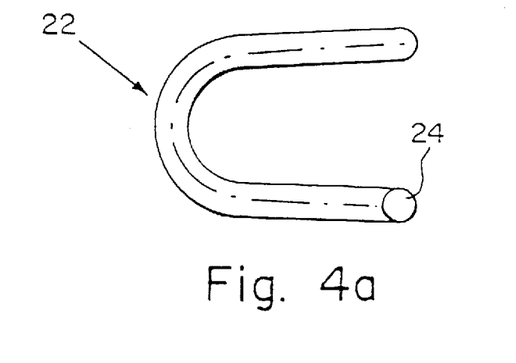
FIGS. 4a and 4b are top and side views, respectively, of the U-shaped portion of FIGS. 3a and 3b without a latch lock.
Figure 4B:
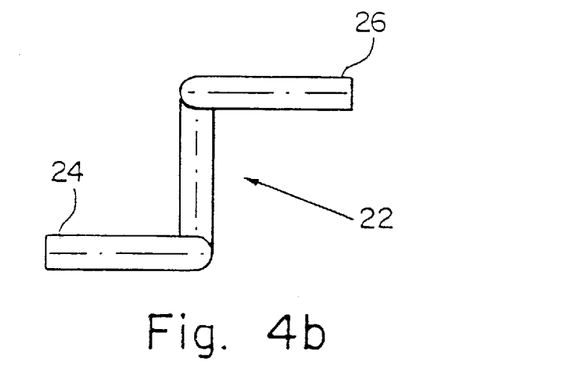
Figure 5A:
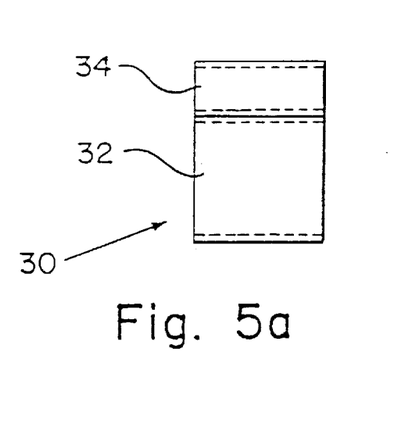
FIGS. 5a and 5b are side and top views, respectively, of the sliding sleeve means of FIGS. 2a and 2b.
Figure 5B:
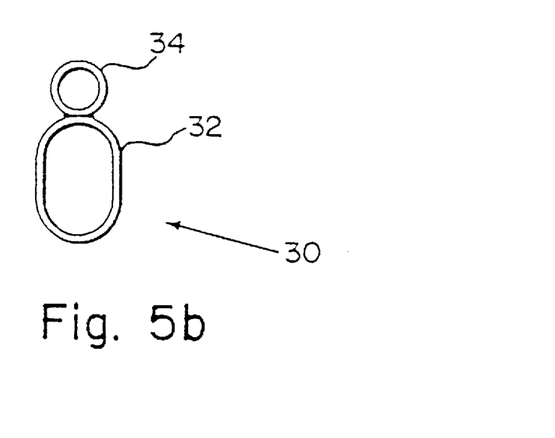

Typically, a connector for connecting panels connects one post of one panel to one post of an adjacent panel. However, connectors can also be constructed to connect one post of one panel to posts of two or more adjacent panels. Referring to FIGS. 2a and 2b, a connector, generally referred to as 20 (ie: everything in FIGS. 2a and 2b except post 12 and rail 16), has a curvilinear or U-shaped portion 22. As also shown in FIGS. 3a, 3b, 4a and 4b, the U-shaped portion 22 has an up-turned leg 24 projecting from one end of the U-shaped portion 22, and a down-turned leg 26 projecting from the other end of the U-shaped portion 22. The down-turned leg 26 is rotatably mounted in a fixed bracket or sleeve 28 welded on a side or the post 12. A sliding sleeve means, generally designated 30, as also shown in FIGS. 5a and 5b, is preferably located above the fixed sleeve 28. The sliding sleeve means 30 comprises a ring portion 32, which has an inner circumference just larger than the circumference of the post 12, to permit the ring portion 32 to slidably engage post 12. Ring portion 32 of the sliding sleeve means 30 is welded to a sliding sleeve 34, which is sized to slidably receive the up-turned leg 24 of the U-shaped portion 22.

A stop means 36, which, in the preferred embodiment is simply a ring around the post 12, is welded to the post 12 above the fixed sleeve 28 and below the sliding sleeve means 30, as shown in FIG. 2a. In the preferred embodiment, referring to FIGS. 3a and 3b, the down-turned leg 26 of the U-shaped portion 22 has a latch lock 38 which is a partial ring welded around approximately ¾ of the circumference of the down-turned leg 26. The latch lock 38 is located near a top portion of the down-turned leg 26.

Figure 6A:
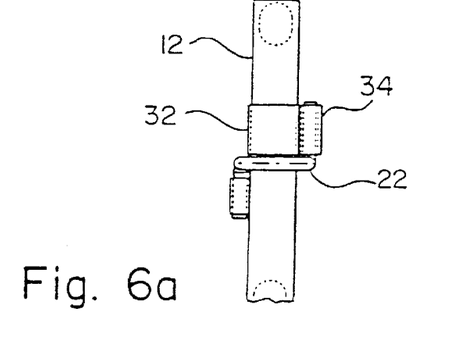
FIGS. 6a–6d, 7a–7d and 8a–8d aare side, top and perspective views of the panel connector of FIGS. 2a and 2b showing, in the different views, various positions of the panel connector.
Figure 6B:
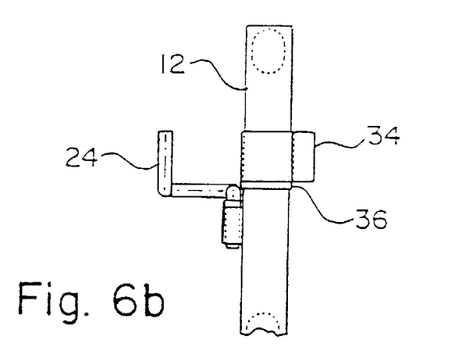
Figure 6C:
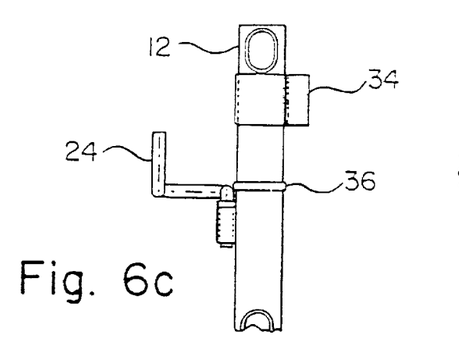
Figure 6D:
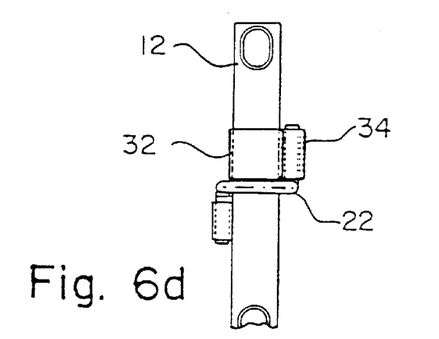
Figure 7A:
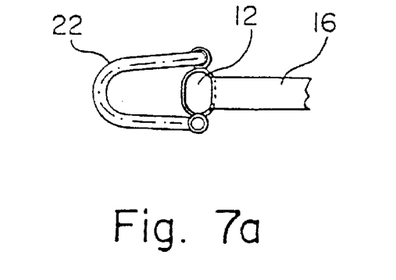
Figure 7B:
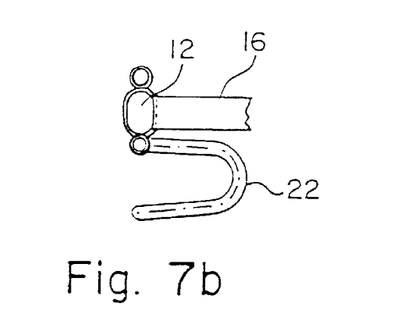
Figure 7C:
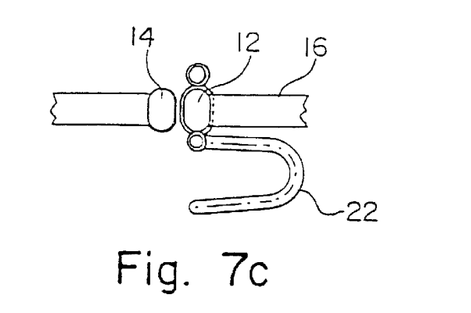
Figure 7D:
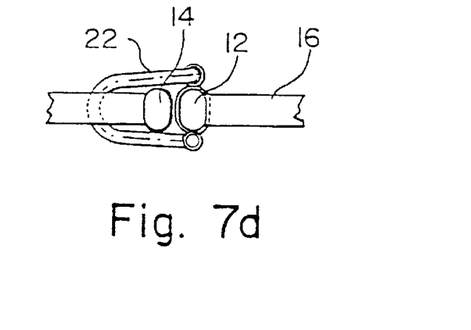
Figure 8A:
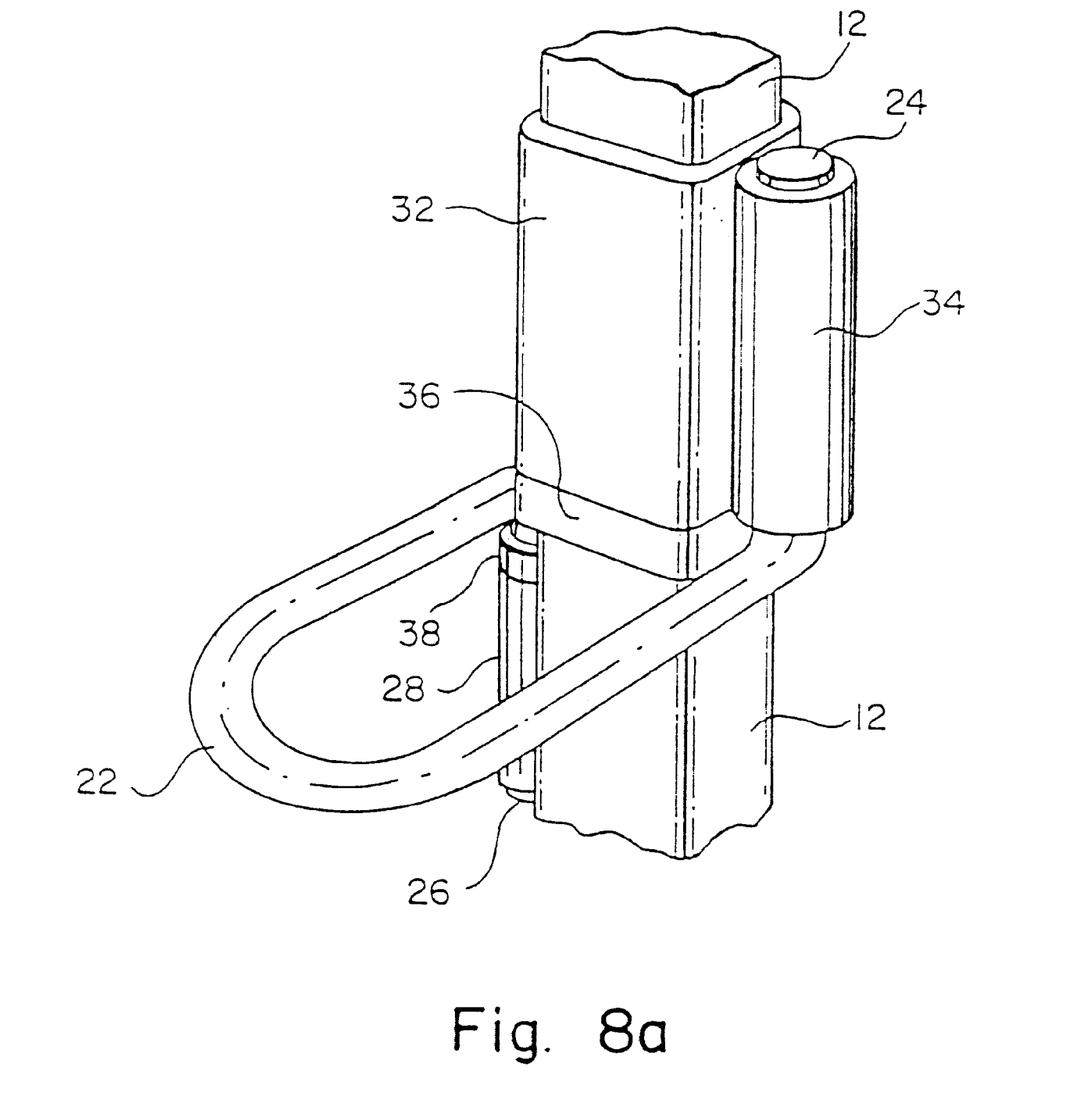

FIGS. 6a–6d, 7a–7d and 8a–8d show different positions of the connector in use, in side view, top view and perspective view, respectively. FIGS. 6a, 7a and 8a show the connector in the closed position, without an adjacent panel. The connector may be in the closed position shown in FIGS. 6a, 7a and 8a, for example, during shipping of the panel. In this position, the down-turned leg 26 of the U-shaped portion is securely received in the fixed sleeve 28 and the up-turned leg 24 of the U-shaped portion 22 is securely received in the sliding sleeve 34.

Figure 8B:
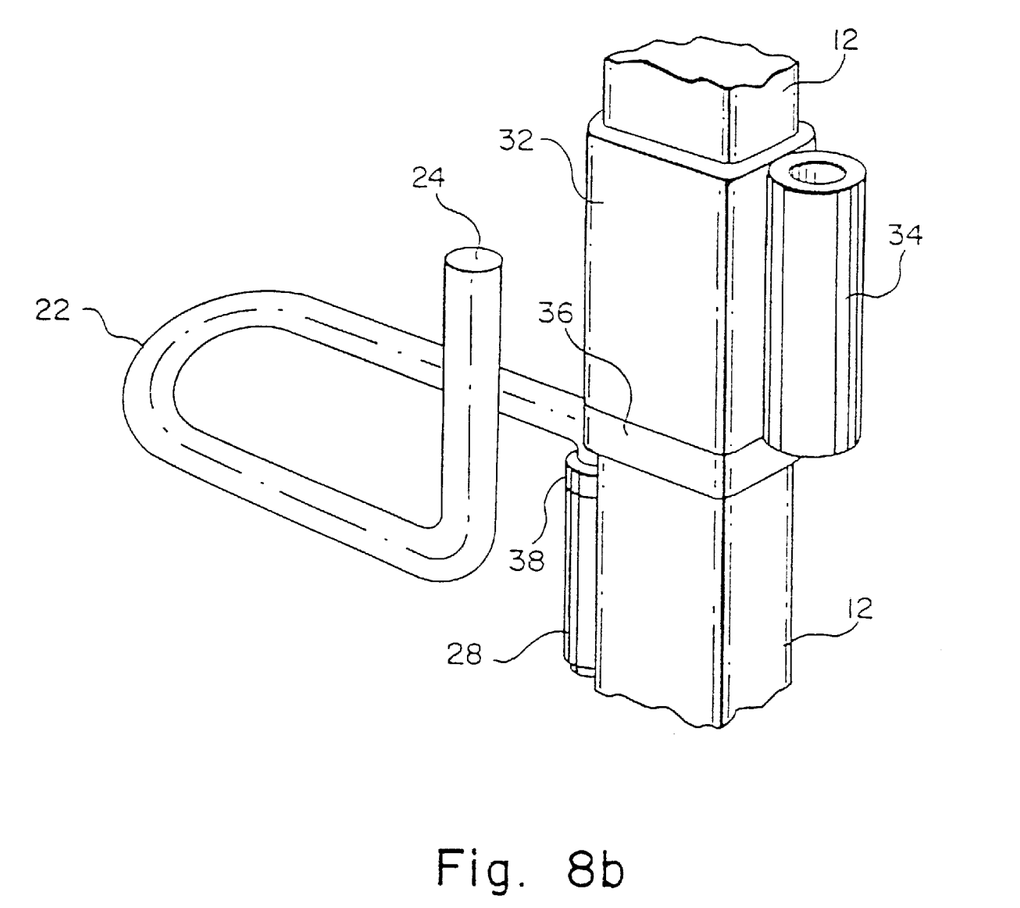
Figure 8C:
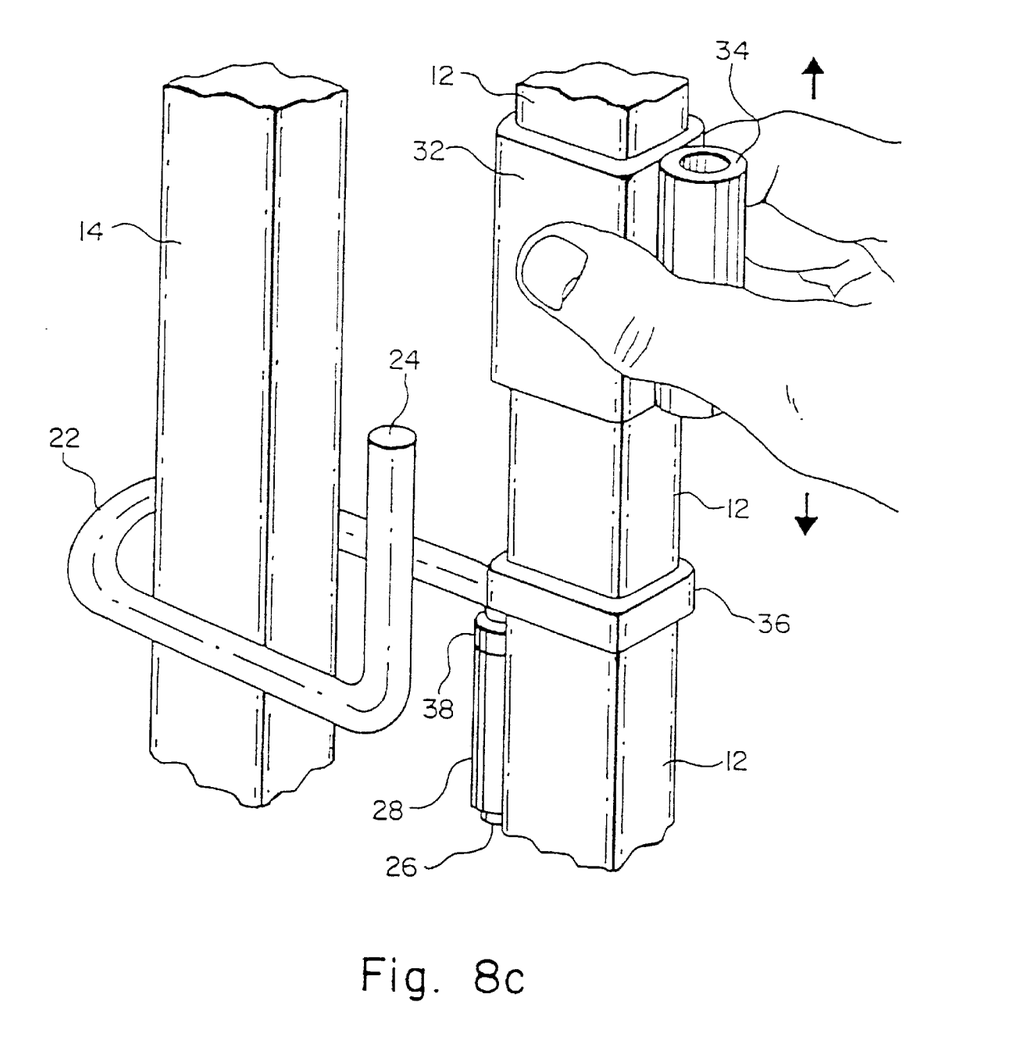

FIGS. 6b, 7b and 8b show the connector in an open position, ready for a post of another panel to be moved adjacent to the post 12 so that the adjacent posts can be connected. (The U-shaped portion 22 in FIG. 8b is rotated 90 degrees from the position of the U-shaped portion 22 in FIGS. 6b and 7b). To move the connector from the position shown in FIGS. 6a, 7a and 8a to the position shown in FIGS. 6b, 7b and 8b, the sliding sleeve 34 is manually slid upwards, beyond the upper end of the up-turned leg 24. Then, to proceed from the position in FIG. 7a to the position in FIG. 7b, the U-shaped portion 22 is manually rotated counterclockwise.

Figure 8D:
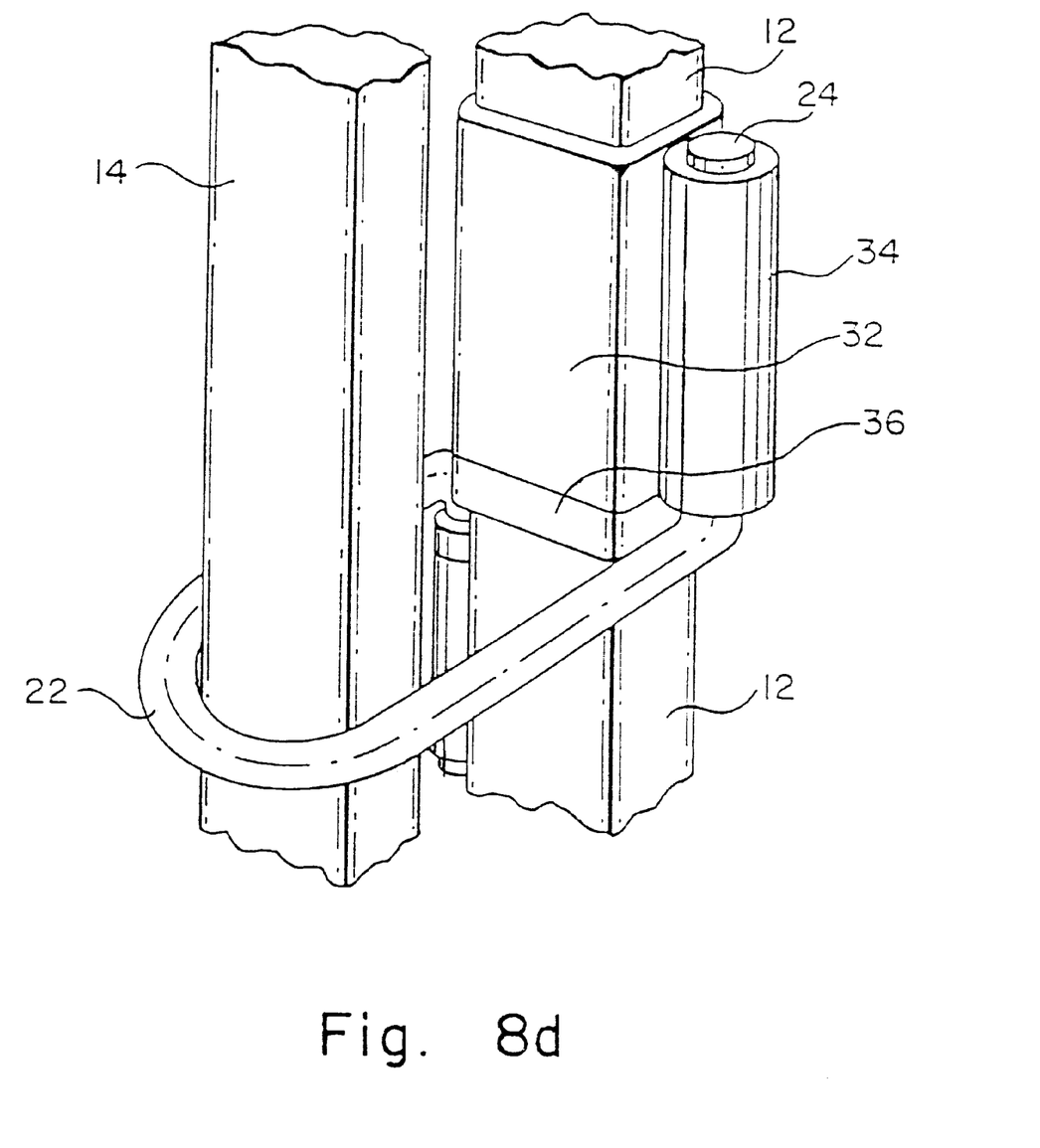

From the position of the connector shown in FIGS. 6b, 7b and 8b, a post 14 of an adjacent panel can be moved adjacent to post 12, as shown in FIG. 7c. Then, to proceed from the position of the connector in FIG. 7c to the position shown in FIG. 7d, the U-shaped portion 22 is manually rotated clockwise. Before the U-shaped portion 22 reaches the closed position shown in FIGS. 6d, 7d and 8d, the sliding sleeve 34 is manually raised above the height of the upper end of the up-turned leg 24. Then, when the U-shaped portion 22 is in the closed position, as shown in FIGS. 6d, 7d, and 8d, the sliding sleeve 34 is slid down over the upturned leg 24, thereby securing the U-shaped portion 22 and accordingly connecting the post 14 to the post 12, as shown in FIGS. 6d, 7d and 8d.

In the preferred embodiment, as shown in FIGS. 2a, 6b, 6c, and 8a–8d, the connector comprises a stop means 36, located above the fixed sleeve 28 and below the sliding sleeve means 30. The stop means 36 defines the lower position of the sliding means 30 when the connector is either of the open or closed positions.

As well, the stop means 36 in combination with the latch lock 38 prevents the U-shaped portion 22 from being lifted out of the fixed sleeve 28, when the connector is in any position other than the open position. Since an animal leaning against a panel may indirectly exert pressure on the connector 20, it is important that the connector remains secure in the closed position, as shown in FIGS. 6d, 7d and 8d unless the sliding sleeve 34 in manually lifted and the U-shaped portion 22 is manually rotated to the open position.

However, it may be desirable to be able to remove the U-shaped portion during transportation, for example, or to replace one sized U-shaped portion with another size to accommodate perhaps a different sized adjacent post or to connect two or more adjacent posts. Since the latch lock 38 is only a partial ring welded around approximately ¾ of the circumference of the down-turned leg 26, when the U-shaped portion 22 is in the open position as shown in FIGS. 6b and 7b, the latch lock 38 does not prevent the down-turned leg 26 of the U-shaped portion 22 from being manually lifted out of the fixed sleeve 28.

Figure 9A:
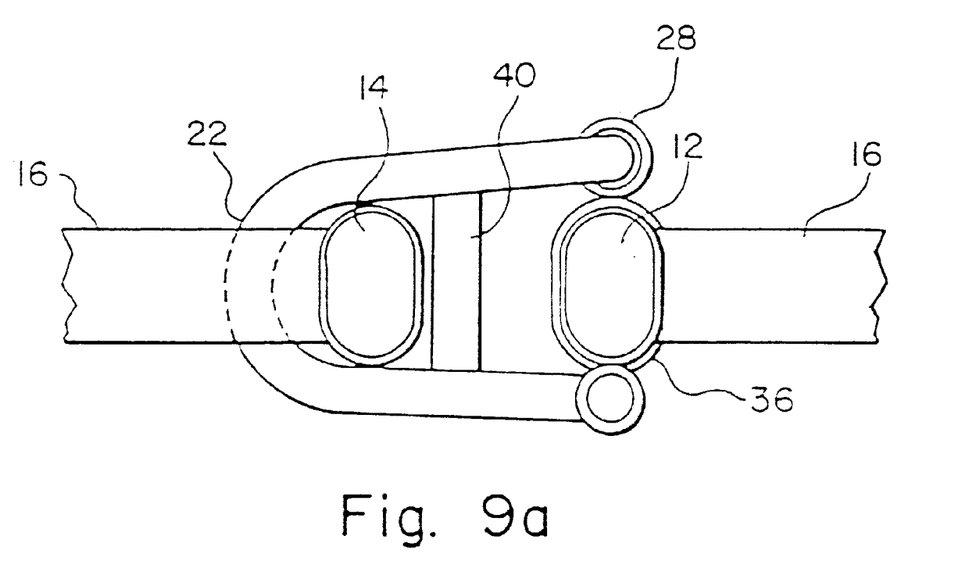
FIG. 9a is a top view of a panel connector in the closed position, in accordance with a further embodiment of the present invention.
Figure 9B:
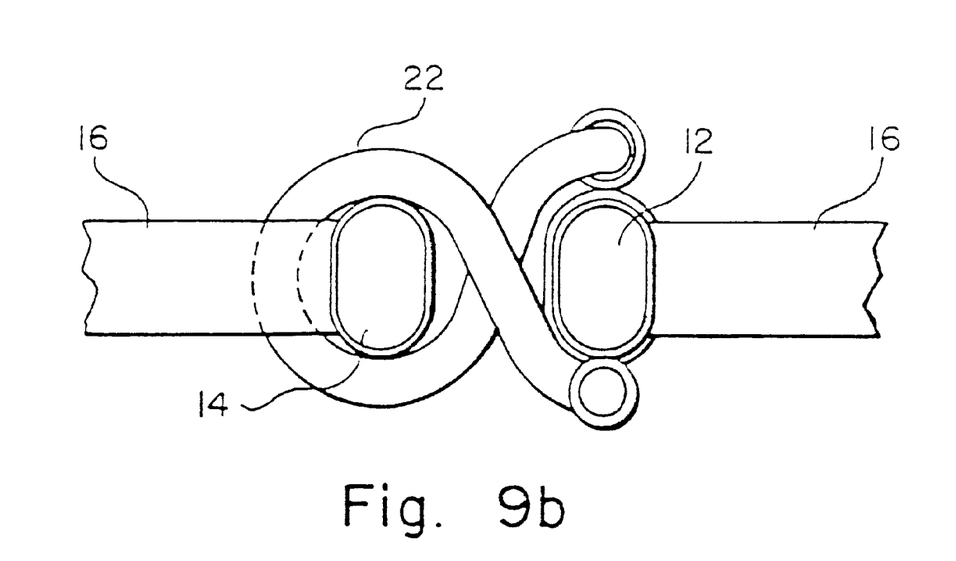
FIG. 9b is a top view of a panel connector in the closed position, in accordance with yet another embodiment of the present invention.

Numerous modifications and variations of the present invention are possible in light of the above teachings. It is therefore to be understood that within the scope of the appended claims, the invention may he practised otherwise than as specifically described herein. For example, different configurations of the connector are possible. FIG. 9a shows a possible configuration where the U-shaped portion 22 is slidably engaged, to one post 14 by means of additional bar 40. In this configuration, the sliding sleeve means 36 and the fixed sleeve means are connected not to the same post 14 as the U-shaped portion, but are connected to the adjacent post 12. In this configuration, the down-turned arm (not shown) of the U-shaped portion 22 is slidably engaged with the fixed sleeve 28, while the sliding sleeve means 36 is lifted above the height of the up-turned arm (not shown) of the U-shaped portion. The sliding sleeve is then lowered to slidably receive the up-turned arm of the U-shaped portion 22, thereby connecting the post 12 to the post 14. The configuration shown FIG. 9b is essentially the same as that shown in FIG. 9a except that U-shaped portion 22 in FIG. 9b is slidably engaged on post 14 by virtue of the twisted shape of the U-shaped portion 22, instead of by virtue of bar 40 shown in FIG. 9a.

What we claim as our invention is:

1. A connector for detachably connecting adjacent fencing panels, each fencing panel including two vertical end posts and a plurality of horizontal frame members disposed between the end posts, said connector comprising a rigid encompassing member and mountings, said mountings being spaced apart from each other and being adapted to be mounted solely on an end post of a first panel, the encompassing member being adapted to be secured into the mountings and adapted to encompass an end post of a second panel for detachably connecting the said end post of the second panel to the said end post of the first panel, the encompassing member comprising two free ends wherein one of the two free ends is adapted to be hinged mounted to one of the mountings and the other of the two free ends is adapted to be slidably mounted into another of the mountings.

2. The connector of claim 1 wherein one of the mountings is adapted to be slidable about the end post of the first panel.

3. A connector for detachably connecting adjacent fencing panels, each fencing panel including two vertical end posts and a plurality of horizontal frame members disposed between the end posts, said connector comprising a rigid encompassing member and mountings, said mountings being spaced apart from each other and being adapted to be mounted solely on an end post of a first panel, the encompassing member being adapted to be secured into the mountings and adapted to encompass an end post of the second panel for detachably connecting the said end post of the second panel to the said end post of the first panel, the encompassing member comprising two free ends wherein each one of the two free ends is adapted to be slidably secured into the mountings.

4. In a panel system for confining an animal comprising a plurality of panels, each panel comprising an integral, substantially rectangular rigid structure including a bottom, a top, a first end and a second end, a connector having an open position and a closed position for connecting a first end of a first panel to a second end of an adjacent panel, the connector comprising a rigid, U-shaped portion;

a pivotal connection means for pivotally connecting the U-shaped portion to the first end of the first panel; and a sliding sleeve, slidably connected to the first end of the first panel and adapted to secure the U-shaped portion in the closed position wherein, from the open position, the U-shaped portion is rotatable about the second end of the adjacent panel and the sliding sleeve is slidable to secure the U-shaped portion in the closed position.

5. The connector of claim 4 wherein the U-shaped portion comprises a U-shaped section being substantially in a horizontal plane having, at either end, a leg projecting at a substantially right angle to the plane of the U-shaped section and wherein a first leg projects generally upwardly and a second leg projects generally downwardly.

6. The connector of claim 5 wherein the pivotal connection means comprises a fixed sleeve projecting from the first end of the first panel and wherein the fixed sleeve is of sufficient circumference to receive one of said first leg and said second leg of the U-shaped portion.

7. The connector of claim 6 wherein the sliding sleeve is located above the fixed sleeve on the first end of the first panel.

8. The connector of claim 7 wherein the connector further comprises a stop means for preventing the sliding sleeve from sliding below a certain point on the first end of the first panel.

9. The connector of claim 8 wherein the stop means comprises a ring projecting around the circumference of the first end of the first panel.

10. The connector of claim 9 wherein the one of said first leg and said second leg of the U-shaped portion received in the fixed sleeve further comprises a latch lock preventing the one of said first leg and said second leg of the U-shaped portion received in the fixed sleeve from being lifted from the fixed sleeve while the connector is in the closed position.

11. The connector of claim 10 wherein the latch lock comprises a ring projecting around approximately ¾ the circumference of the one of said first leg and said second leg of the U-shaped portion received in the fixed sleeve.

12. A connector for fence panels comprising an encompassing member including a rigid curvilinear portion being substantially in a horizontal plane;

a first vertically oriented portion extending from an end of the curvilinear portion and a second vertically oriented portion extending from another end of the curvilinear portion;

a slidable, vertically oriented female bracket, said bracket being adapted to secure one of said first vertically oriented portion and said second vertically oriented portion, said bracket being further adapted to move vertically on a first fence panel post from a connected position to an unconnected position;

a female fitting adapted to be fixedly attached to said first panel post, the female fitting adapted to hingedly engage the other of said first vertically oriented portion and said second vertically oriented portion;

whereby said encompassing member is adapted to encompass a second fence post of a second fence panel when one of said first verticality oriented portion and said second vertically oriented portion is secured in said female bracket and the other of said first vertically oriented portion and said second vertically oriented portion is engaged in the said female fitting.

13. A panel in a panel system for confining an animal, the panel system comprising a plurality of panels, each panel comprising an integral, substantially rectangular rigid structure including a bottom, a top, a first end and a second end wherein the panel comprises a connector having an open position and a closed position for connecting a first end of the panel to a second end of an adjacent panel, the connector comprising a rigid, U-shaped portion;

a pivotal connection means for pivotally connecting the U-shaped portion to the first end of the panel; and a sliding sleeve, slidably connected to the first end of the panel and adapted to secure the U-shaped portion in the closed position wherein, from the open position, the U-shaped portion is rotatable about the second end of the adjacent panel and the sliding sleeve is slidable to secure the U-shaped portion in the closed position.

14. In a panel system for confining an animal comprising a plurality of fencing panels, each panel comprising an integral, substantially rectangular rigid structure including a bottom, a top, a first end and a second end, a connector for connecting a first end of a first panel to a second end of an adjacent panel, the connector comprising a rigid, U-shaped portion slidably connected to the first end of the first panel;

a fixed sleeve projecting from the second end of the adjacent panel and adapted to receive a first end of the U-shaped portion; and a sliding sleeve, slidably connected to the second end of the adjacent panel and adapted to receive a second end of the U-shaped portion wherein, to connect the first end of the first panel to the second end of the adjacent panel, the first end of the U-shaped portion is slid into the fixed sleeve and then the sliding sleeve is slid onto another end of the U-shaped portion.

* * * * *

UNITED STATES PATENT AND TRADEMARK OFFICE
CERTIFICATE OF CORRECTION

PATENT NO. : 5,964,548
DATED : October 12, 1999
INVENTOR(S) : Allan Akins, Joe Kuffner and Len Peters It is certified that error appears in the above-identified patent and that said Letters Patent is hereby corrected as shown below:

Column 3, Line 2 "hinged" should be -- hingedly --
Column 3, Line 10 "hinged" should be -- hingedly --
Column 3, Line 20 "and" should be --end--
Column 4, Line 14 "is FIGS. " should be -- FIGS. --
Column 4, Line 16 "aare" should be -- are --
Column 4, Line 30 "paneled" should be -- panels --
Column 4, Line 62 "or" should be --of --
Column 6, Line 46 "hinged" should be -- hingedly --

Signed and Sealed this

Thirteenth Day of June, 2000

Attest:

Q. TODD DICKINSON

*Attesting Officer*                *Director of Patents and Trademarks*